United States Patent
Bruls et al.

(10) Patent No.: US 12,197,045 B2
(45) Date of Patent: Jan. 14, 2025

(54) PROGRESSIVE ADDITION EYEGLASS LENS AND METHOD FOR MANUFACTURING THE SAME

(71) Applicants: Cartesian Optics B.V., Nijmegen (NL); Georgius Jozephus Cyrillus Ludovicus Bruls, Nijmegen (NL)

(72) Inventors: Georgius Jozephus Cyrillus Ludovicus Bruls, Nijmegen (NL); Nikolas Martin Scholz, Frankfurt am Main (DE)

(73) Assignees: Cartesian Optics B.V., Nijmegen (NL); Georgius Bruls, Nijmegen (NL)

( * ) Notice: Subject to any disclaimer, the term of this patent is extended or adjusted under 35 U.S.C. 154(b) by 504 days.

(21) Appl. No.: 17/641,615

(22) PCT Filed: Sep. 9, 2020

(86) PCT No.: PCT/NL2020/050556
§ 371 (c)(1),
(2) Date: Mar. 9, 2022

(87) PCT Pub. No.: WO2021/049931
PCT Pub. Date: Mar. 18, 2021

(65) Prior Publication Data
US 2022/0326544 A1     Oct. 13, 2022

(30) Foreign Application Priority Data

Sep. 9, 2019 (NL) ..................................... 2023797

(51) Int. Cl.
*G02C 7/06* (2006.01)
*G02C 7/02* (2006.01)

(52) U.S. Cl.
CPC ............. *G02C 7/028* (2013.01); *G02C 7/065* (2013.01); *G02C 7/068* (2013.01)

(58) Field of Classification Search
None
See application file for complete search history.

(56) References Cited

U.S. PATENT DOCUMENTS 3,722,986 A    3/1973  Tagnon
3,950,082 A    4/1976  Volk
(Continued)

FOREIGN PATENT DOCUMENTS

DE    1422125    9/1969
RU    2364375    8/2009

OTHER PUBLICATIONS

Guilino, "Neue Progressive Flachen", Deutsche Optikerzeitung, Nov. 20, 1980, pp. 20-23, nr. 11, Opt. Fachveroeff, Heidelberg, DE.
(Continued)

*Primary Examiner* — Darryl J Collins
(74) *Attorney, Agent, or Firm* — Marcus C. Dawes (57) ABSTRACT

The present invention relates to a progressive addition lens and to a method for manufacturing the same. A lens comprises a rear surface intended to face an eye of the user and a front surface opposite to the rear surface. The present invention is particularly related to defining the rear surface of the lens. The present invention shows that it is possible to enhance image quality by using rotational symmetry in combination with a predefined progression curve to thereby avoid astigmatic imaging and also substantially reducing the effects of spherical aberration, coma, curvature of field and distortion.

20 Claims, 4 Drawing Sheets

(56) References Cited

U.S. PATENT DOCUMENTS

| | | | | |
|---|---|---|---|---|
| 2004/0032565 A1* | 2/2004 | Yamakaji | ............... | G02C 7/061 |
| | | | | 351/159.42 |
| 2011/0013137 A1* | 1/2011 | Kitani | ................... | G02C 7/061 |
| | | | | 351/159.42 |
| 2011/0317127 A1* | 12/2011 | Suzuki | ................... | G02C 7/061 |
| | | | | 351/159.06 |
| 2018/0088353 A1* | 3/2018 | Altheimer | .............. | G02C 7/065 |
| 2019/0258081 A1* | 8/2019 | Yanari | ................... | G02C 7/028 |
| 2019/0324291 A1* | 10/2019 | Hatanaka | ............... | G02C 7/027 |

OTHER PUBLICATIONS

Michaelis et al., "Cartesian oval representation of freeform optics in illumination systems", Optics Letters, Mar. 15, 2011, pp. 918-920, vol. 36, No. 6, Optical Society of America.

Erb, "Das kartesische oval in der Optik", Phys. Unserer Zeit, Mar. 2011, pp. 125-129, nr. 42, Wiley-VCH Verlag GMBH, Weinheim, DE.

* cited by examiner

PROGRESSIVE ADDITION EYEGLASS LENS AND METHOD FOR MANUFACTURING THE SAME

The present invention relates to a progressive addition lens and to a method for manufacturing the same. A lens comprises a rear surface intended to face an eye of the user and a front surface opposite to the rear surface. The present invention is particularly related to defining the rear surface of the lens.

Progressive addition eyeglass lenses are characterized by an optical strength, expressed in dioptries (D) that varies from the upper part of the lens towards its lower part. The value at the top corresponds to the user's long distance prescription value, the value at the bottom to the user's reading distance prescription value. The region in between is responsible for intermediate distances. Irrespective of the long distance prescription value, the difference between reading value and long distance value, called the addition, takes on typical values between about +0.5 D and +3.5 D. It is meant to compensate for the age-induced loss of accommodation capability of the human eye, referred to as presbyopia. The change of optical strength on a line essentially down the middle of the eyeglass, referred to as vertex line, is described by the progression curve. More in particular, the progression curve provides a desired optical strength of the lens as a function of a viewing angle at which a user looks through the lens. Instead of the viewing angle, a height position on the lens relative to a line that corresponds to the user looking straight ahead could equally be used.

The purpose of progressive eyeglasses is to provide good imaging qualities, resulting in good eyesight, not only along the vertex line, but also to the left and right thereof, as far as possible towards the left and right edges of the eyeglass. Good eyesight requires good imaging qualities of the eyeglass, more precisely the imaging qualities of the combined optical system of eyeglasses and eyes. Imaging quality can be evaluated in terms of the five main optical aberrations, namely spherical aberration, coma, astigmatism, curvature of field and distortion.

Astigmatic imaging literally means non-point-like imaging of an object point. There are two kinds of astigmatism. The first is called surface astigmatism, meaning that the immediate surroundings of a surface point under consideration are not spherical, which means that the curvature of the lens is different in different directions. The second kind is called imaging astigmatism. This is caused by the fact that the meridional focal length and the sagittal focal length tend to be different even for surfaces exhibiting no surface astigmatism. A spherical lens for example, whose surfaces do not exhibit any surface astigmatism by definition, does show imaging astigmatism for points not lying on the optical axis of the lens. As far as image quality is concerned, both kinds of astigmatism are considered to be relevant. Generally speaking, optical design is aimed at minimizing the combined effect of both kinds of astigmatism, which is a notoriously difficult optical problem.

A known method for manufacturing a progressive addition eyeglass lens comprises the following steps. First, a predefined progression curve is provided that describes a desired optical strength of the lens as a function of a viewing angle at which a user looks through the lens. This progression curve is typically calculated using measurements performed by an optometrist.

The optical strength of a lens is directly related to its curvature, which is defined as the second spatial derivative of both front and rear surfaces of the lens. The curvature should be determined for a rear vertex line and a front vertex line, which vertex lines extend from a start point corresponding to a distance viewing area of the lens to an end point corresponding to a reading area of the lens. The curvature along the rear and front vertex line is directly related to the predefined progression curve. Since a surface is two-dimensional, the curvature perpendicular to the front and rear vertex line has to be determined separately. In order to clearly discriminate between the two types of curvature, the denomination longitudinal curvature will be used for the curvature along the rear or front vertex line and transverse curvature will be used for the curvature perpendicular to the rear of front vertex line.

Known lenses are manufactured from so-called blanks having a predefined curvature and because of economical considerations, the front surface often has a predefined curvature. For example, the front surface may be a spherical surface, which has constant curvature by definition. In this case, the curvature of the rear surface is directly related to and determined by the predefined progression curve.

According to the known method, the transverse curvature is taken to be essentially equal to the longitudinal curvature everywhere on the rear vertex line. This type of rear vertex line of a varifocal lens is called an umbilical vertex line. Another way of stating this is that the immediate surroundings of all points on the rear vertex line are spherical. Still another way of expressing the same fact is saying that the surface astigmatism on an umbilical vertex line is equal to zero.

Generally speaking, having spherical surfaces does not guarantee the absence of astigmatic imaging. Even though every point of a spherical surface is umbilical by definition, it is well known that spherical lenses exhibit astigmatic imaging for object points not lying on the optical axis of the lens. This occurs because the focal length for meridional rays tends to be different from the focal length for sagittal rays.

Known progressive lenses suffer from a problem in that a user may only obtain a sharp and non-deformed image at the center of the lens, i.e. along the vertex line. This is a well known problem and is referred to as the Minkwitz theorem that states:

"If the surface astigmatism of a singly symmetrical aspheric surface is made zero along its vertex line, then it cannot remain small at points outside this vertex line. The surface astigmatism at points outside the vertex line grows at twice the rate of increase of the refracting power in the direction of the vertex line."

The abovementioned problem is referred to as the so called corridor in progressive glasses, outside of which the eyesight becomes more and more blurred and distorted towards the left and right sides of the glasses. For users this means that especially the intermediate and near/reading zones have a width considerably smaller than the width of the glasses themselves. It compels the reader to turn his/her head instead of turning just the eyes from left to right when reading a newspaper for instance. Or they feel insecure when going down stairs because not only their feet viewed through the reading zone when looking down but also hands and handrails in the intermediate zone to their left and right are blurred.

The limited width of the viewing zones requires exact measurement of the position of the user's pupils, which must be accounted for both in the design of the glasses themselves and in the positioning of the lenses into the frame, the so called grinding in of the glasses. This is tedious, time consuming and hence expensive for optometrists, suppliers and clients alike.

It is an object of the present invention to provide a progressive addition eyeglass lens in which the abovementioned problems such as lack of sharpness and/or presence of image deformation do not occur or at least to a lesser extent.

This object is achieved with the method as defined in claim 1 that comprises the step of providing a predefined progression curve describing a desired optical strength of the lens as a function of a viewing angle at which a user looks through the lens, wherein the lens comprises a rear surface intended to face an eye of the user and a front surface opposite to the rear surface. The method of the invention further comprises constructing front and rear vertex lines for the lens corresponding to the front and rear surfaces of the lens, respectively, by translating the progression curve into corresponding longitudinal curvatures for the front and back lens surface, wherein the vertex lines extend from a start point corresponding to a distance viewing area of the lens to an end point corresponding to a reading area of the lens. As a next step, the constructed rear vertex line is rotated about a first axis of rotation to construct a main front surface. In addition, the constructed front vertex line is rotated about a second axis of rotation to construct a main front surface. In the main rear surface and the main front surface a cut-out region is defined thereby defining a lens to be manufactured. As a final step, a lens is manufactured in correspondence with the defined lens to be manufactured.

As in the above described known method, the present invention provides a predefined progression curve describing a desired optical strength of the lens as a function of the viewing angle at which a user looks through the lens. In the next step, the progression curve is translated into corresponding longitudinal curvatures for both lens surfaces. In contrast to the known method, the present invention does not take the transverse curvature to be equal to the longitudinal curvature. In fact, at this stage, the present invention does not define or calculate transverse curvatures. Moreover, it can assumed that the front surface is completely defined and of spherical form, by using a so called semi-finished spherical blank. As far as the rear surface is concerned, only the longitudinal curvature and hence only the cross sectional form of the rear surface along its rear vertex line is exactly known at this stage.

In order to obtain a full rear surface, a first axis of rotation is defined around which the abovementioned cross sectional form of the rear surface is rotated. The direction of said first axis of rotation is essentially perpendicular to the plane containing the intended final eyeglass lens.

It is a very surprising insight of the present invention that this axis of rotation can be located inside, but also outside, even far outside, the boundaries of the final eyeglass lens. In order to retain a more or less vertical varifocal profile, said first axis of rotation is positioned essentially vertically away, either upward or downward, from the center of the intended final eyeglass lens. The vertical shift can be up to 3 times the vertical dimension, in the order of 40 mm, of the final eyeglass lens, about 120 mm, upwards or downwards. In fact, the imaging properties, including power profile, astigmatism and image deformation of the resulting eyeglass lens, turn out to be strongly dependent on the position of this first rotation axis. By rotating the rear vertex line of the rear surface around the chosen first rotation axis, a rotationally symmetric lens surface is generated with a radius equal to the abovementioned vertical shift. The final eyeglass rear surface is obtained by cutting out a region with the contours of the final eyeglass lens and that contains the progression region, i.e. the region where the optical strength varies according to the predefined progression curve. Typical eyeglass dimensions are in the order of 40 mm vertically and 50 mm horizontally.

The first and second axis of rotation can each be essentially perpendicular to a plane containing the intended final eyeglass lens. Furthermore, each of the first and second axis of rotation can be located inside, but also outside, even far outside, the boundaries of the final eyeglass lens. Generally, each of the first and second axis of rotation extends from or passes through a position that corresponds to an intended position of the eye relative to the eyeglass lens.

The translating of the progression curve into corresponding longitudinal curvatures for the front and back lens surface may comprise constructing a rear vertex line corresponding to the rear surface of the lens using a plurality of segments, each line segment corresponding to a Cartesian oval of which the focal points and/or focal lengths are determined, by means of optimization, in dependence of the desired optical strength for that line segment and a desired imaging quality.

The Applicant has found that it is not necessary to minimize, let alone eliminate, surface astigmatism and imaging astigmatism to optimize imaging quality. As noted above, prior art approaches focus on using spherical lens segments along the vertex line with the intent to reduce surface astigmatism. On the contrary, the present invention shows that it is possible to enhance image quality by combining Cartesian ovals with rotational symmetry to thereby avoid astigmatic imaging and also substantially reducing the effects of spherical aberration, coma, curvature of field and distortion.

Typically, the size of the line segments corresponds to a size of a pupil, typically in the order of 4 mm.

Cartesian ovals are well known in the art, and are characterized by two focal points, hereinafter referred to as inner focal point and outer focal point. Accordingly, constructing a rear vertex line may comprise calculating, by means of optimization, for each line segment, an inner focal point and/or inner focal length corresponding to a side of the rear surface facing away from the eye of the user, and an outer focal point and/or outer focal length corresponding to a side of the rear surface facing the eye of the user in dependence of the desired optical strength for that line segment and a desired imaging quality. This calculating may further comprise finding, for each line segment, by means of optimization, the inner focal point and/or inner focal length and the outer focal point and/or outer focal length such that for these focal points and/or focal lengths the optical strength of that line segment is within a predefined range of the desired optical strength for that line segment and such that a size of a region of least confusion has an at least local minimum.

The size of the region of least confusion for a Cartesian oval that is currently tried for a given line segment can be determined in between a sagittal focal plane and a meridional focal plane of a segment lens corresponding to said line segment, wherein the vertex line at least locally extends in said meridional focal plane, and wherein a shape of the segment lens is determined by rotating the Cartesian oval around the first axis of rotation. Typically, known ray tracing techniques can be used, optionally including a model of the user's eye, to determine the size of the region of least confusion.

The rotation of the Cartesian oval generally results in the points on the vertex line having a curvature that is different along the vertex line and in a direction perpendicular to the vertex line.

For finding the inner focal point and/or inner focal length of a next line segment, the value of the inner focal point and/or inner focal length of a current segment is taken. In this manner, the optimization procedure, typically carried out in a processor of a computer or other computation device, can be performed efficiently.

The rear vertex line can be constructed such that the start point of the rear vertex line and a corresponding start point of the front vertex line correspond to umbilical points of the main rear surface and main front surface, respectively, wherein the first axis of rotation passes through the start points of the rear and front vertex lines.

The first and/or second axis of rotation, and preferably both, can be parallel to a line of sight, said line of sight corresponding to a line extending from an intended position of a user's eye relative to the eyeglass lens to a distant point when said user's eye is looking straight ahead. In addition, the first axis of rotation may be displaced relative to said line of sight and/or the second axis of rotation may coincide with said line of sight.

The main front surface can be predefined, e.g. spherical. In this case, the focal points and/or focal lengths of the respective Cartesian oval for each line segment can be determined by the optical strength of a corresponding line segment of the main front surface and said desired imaging quality, wherein the desired optical strength for each line segment of the rear vertex line is calculated, using the progression curve, in dependence of a desired optical strength of the lens corresponding to that line segment.

The predefined progression curve is preferably smooth and at least two times differentiable. This allows the line segments and more in particular the Cartesian oval segments, to connect smoothly to each other, preferably in a manner in which the first derivative is continuous between adjacent segments. Furthermore, the predefined progression curve preferably has a sigmoid shape, but can also be linear.

The method of the invention may further comprise performing a relative rotation of the main front surface relative to the main rear surface relative to a third axis of rotation prior to defining the cut-out region to be used for manufacturing the lens, to allow an upper and lower portion of the lens to have comparable thickness. This third rotation is a known step in lens manufacturing and ensures that a suitable thickness of the lens can be obtained near its edges.

This third axis of rotation may extend in a direction perpendicular to the first axis of rotation and the rear vertex line.

Said manufacturing a lens in correspondence with the defined lens segment may comprise manufacturing the lens to have the front surface thereof corresponding to the cut-out region of the main front surface and the rear surface thereof corresponding to the cut-out region of the main rear surface. Alternatively, the method may further include subjecting the lens segment to a differential torical deformation, and wherein said manufacturing a lens in correspondence with the defined lens segment comprises manufacturing the lens to have a shape that corresponds to the deformed lens segment.

According to a second aspect, the present invention provides a progressive addition eyeglass lens having a rear surface intended to face the eye of a user and a front surface opposite to the rear surface. The lens is characterized in that the lens is manufactured in correspondence with a lens to be manufactured, said lens to be manufactured having been defined by defining a cut-out region in the main rear surface and the main front surface, wherein the main rear and front surface comprise a surface of revolution created by rotating a rear and front vertex line around a first and second axis of rotation, respectively, said rear and front vertex line corresponding to a translation of a progression curve into corresponding longitudinal curvatures for the rear and front lens surface.

The rear vertex line may comprise a smooth connection of line segments, each line segment corresponding to a Cartesian oval of which the focal points and/or focal lengths have been determined, by means of optimization, in dependence of a desired optical strength for that line segment and a desired imaging quality, said desired optical strength depending on a predefined progression curve that describes a desired optical strength of the lens as a function of a viewing angle at which a user looks through the lens.

The first and/or second axis of rotation, and preferably both, can be parallel to a line of sight, said line of sight corresponding to a line extending from an intended position of a user's eye relative to the eyeglass lens to a distant point when said user's eye is looking straight ahead. In addition, the first axis of rotation can be displaced relative to said line of sight and/or the second axis of rotation may coincide with said line of sight.

The front surface of the lens may correspond to the cut-out region of the main front surface and the rear surface to the cut-out region of the main rear surface. Alternatively, the lens to be manufactured may have been subjected to a differential torical deformation, and the lens may have a shape that corresponds to the deformed lens to be manufactured.

It should be noted that the main front surface need not be predefined. It may equally be constructed using Cartesian ovals, of which a circle is but one example. Moving away from the requirement that the front surface is spherical will generally increases the imaging quality of the lens. However, this will considerably increase the computational effort to arrive at the main front and rear surface and may increase the manufacturing costs as general blanks may no longer be used.

By exploiting rotational symmetry, the differential equations involved are surprisingly easy to solve, yielding both the optical power (profile) as perceived by the user and the accompanying astigmatism. It is conventionally thought that this unavoidable (often called unwanted) astigmatism should be kept below 0.5 D. However, prototypes of eyeglasses computed and produced according to the present invention provide excellent eyesight in near, intermediate and reading zones for astigmatic values substantially exceeding 0.5 D.

Nevertheless, by applying (differential) toric deformation of the glasses, both the power and astigmatism profiles can be modified. Toric deformation of eyeglass lenses is well known and used to correct astigmatism of the eye. It is a further very surprising insight of the present invention that similar techniques can be used to modify both power and astigmatism profiles of initially rotationally symmetric glasses.

The present invention provides a surprising new insight that it is not necessary to minimize, let alone eliminate, surface astigmatism and imaging astigmatism to optimize imaging quality. On the contrary the present invention shows that it is possible to enhance image quality by minimizing the size of the regions of least confusion and let them coincide with the image planes, including the retina of the eye, of the eyeglass-eye system.

In the abovementioned optimizing of imaging quality, it may happen that the starting progression curve is modified. This has turned out to be unproblematic in practice, because the starting curve can be adapted to yield a certain final progression curve.

Generally, progressive lenses exhibit a kind of image distortion directly related to their inherent change of optical strength. This can be understood by realizing that every eyeglass, be it progressive or not, act as a magnifying (minifying in the case of a negative-strength-glass) where the amount of magnification is proportional to the optical strength. This effect is especially clear when the eyeglass, in the manner of a magnifying glass, is kept at some distance from the eye, for instance half a meter away. When using a magnifying glass very close to the eye (indeed like a pair of eyeglasses in its normal position on the nose), the apparent magnification is much smaller, but still existent. Therefore a vertically elongated object like a lantern post takes on a bottle-like appearance when viewed in this way through any progressive glass, growing in width from top to bottom. In the Cartesian progressive glasses of the present invention, this is essentially the only kind of deformation. State-of-the-art progressive glasses exhibit a further kind of deformation which is directly linked to the geometry of the corridor. Actually, progressive glasses according to the present invention can be distinguished from state-of-the-art progressive glasses just by inspecting their respective deformation (patterns).

Measurement/evaluation of progressive glasses is generally done by means of a standard optical instrument called a lensometer. Such an instrument measures the local optical properties for selected points on/of the glass. In the case of progressive glasses according to the present invention, it produces very paradoxical results. At various occasions, lensometer readings of the eyeglasses of the present invention indicated cylinder values C (associated with astigmatism) in excess of C=0.5 D. According to common knowledge, such a glass is unusable due to astigmatic i.e. blurred imaging. Much to the surprise of the various operators, the lensometer values did not comply with an actual wearing test of the same glasses by the operator (or bystanders). According to their own eyes, the glasses provided excellent eyesight. They in particular confirmed the extraordinary width of the viewing zones. It means that standard lensometers are not suitable for the evaluation of progressive glasses according to the present invention. This is caused by the fact that standard lensometers evaluate the sphericity of the immediate surroundings of the selected measuring points. Conventionally, a cylinder value in excess of C=0.5 is interpreted as a too large deviation from sphericity. State-of-the-art progressive glasses fulfilling the umbilical (spherical) points criterion indeed achieve good imaging quality on and very near to the middle of their corridor. The present invention shows that moving away from the umbilical points on the vertex line is not only advisable, but also possible. Actually, the eyeglass lenses of the present invention prove that abandoning the umbilical points requirement yields good imaging qualities for the whole glass.

Next, the present invention will be described referring to the appended drawings, wherein.

Figure 1:
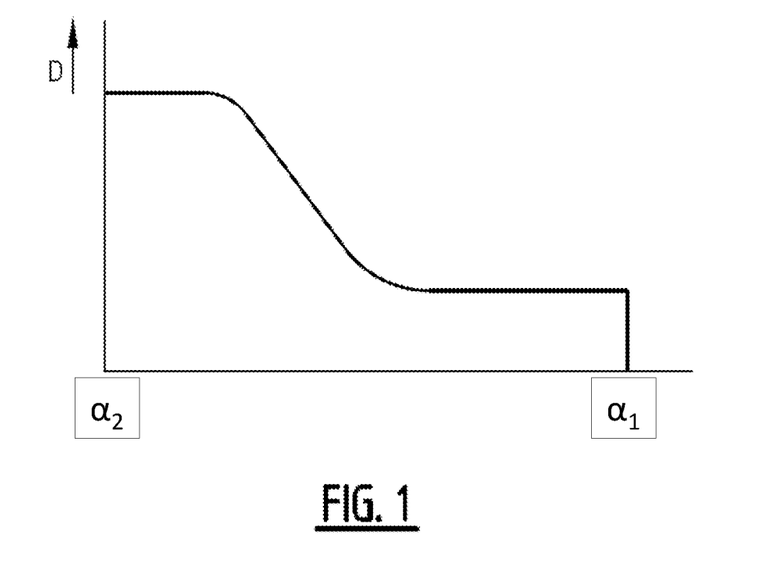
FIG. 1 illustrates an exemplary progression curve.

In FIG. 1, a progression curve is illustrated that describes the optical strength of the lens as a function of the angle at which the user looks at the lens. This angle is illustrated in more detail in FIG. 3.

Figure 2:
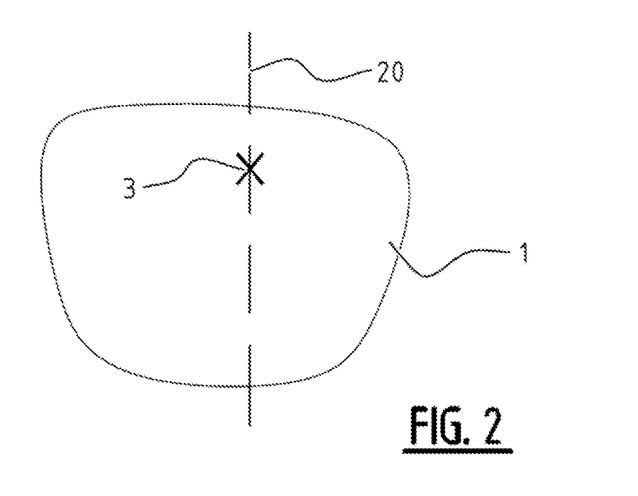
FIG. 2 illustrates a general form of eyeglass lens.

FIG. 2 illustrates an eyeglass lens 1 in accordance with the present invention. A line 20 extends vertically through lens 1. Here, line 20 extends through the highest points on the lens and is generally referred to as vertex line.

Figure 3:
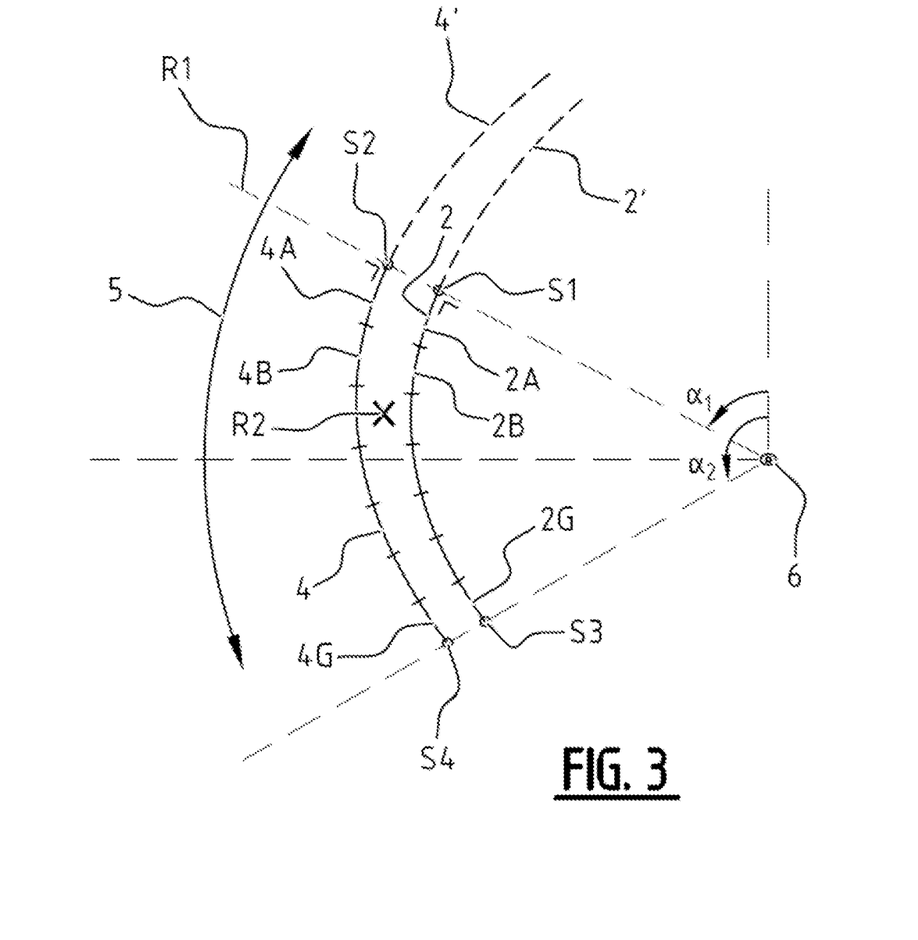
FIG. 3 illustrates the construction of an eyeglass lens according to the invention.

FIG. 3 illustrates the construction of eyeglass 1 in accordance with the present invention. This construction is performed based on the progression curve shown in FIG. 1.

In FIG. 3, an eye is represented by a point 6. A first axis of rotation R1 is drawn from point 6. At a given distance from point 6, the construction of a rear vertex line 2 and a front vertex line 4 starts. Here, front vertex line 4 is assumed known as this line corresponds to a predefined spherical shape of a blank from which eyeglass 1 will be manufactured.

Rear vertex line 2 is segmented in a plurality of line segments 2A-2G. Similar segments 4A-4G can be identified for front vertex line 4. A pair of front and rear line segments, e.g. 2A and 4A, corresponds to a segment of lens 1. Such segment of lens 1 has a given angular position relative to point 6. This angular position is indicated by angle α. For example, at an angle α1 a start point S1 of rear vertex line 2 and a start point S2 of front vertex line 4 can be identified. It should be noted that rear vertex line 2 at least partially forms vertex line 20 as will be explained later.

Front vertex line segment 4A and rear vertex line segment 2A are perpendicular to axis of rotation R1. Rear vertex line segment 2A is formed using a Cartesian oval that is characterized by a focal point A2 located to the left of rear vertex line segment 2A and a focal point C2 located to the right of rear vertex line segment 2A. Similarly, front vertex line segment 4A is formed using a Cartesian oval that is characterized by a focal point A1 located to the right of front vertex line segment 4A and a focal point C1 located to the left of front vertex line segment 2A. As front vertex line 4 is spherical, both A1 and C1 are completely determined as a circle is a particular example of a Cartesian oval.

It should be noted that the optical properties of the lens segment corresponding to rear vertex line segment 2A and front vertex line segment 4A also depend on the refraction index of the final lens material and the distance between line segments 2A, 4A. These two parameters are fixed during optimization so that the Cartesian ovals are fully specified by the parameters A1, C1 or by A2, C2.

Focal points A2 and C2 need to be calculated by means of optimization. This is achieved using ray tracing techniques. More in particular, focal point C2 is the parameter that most strongly determines the optical strength associated with rear vertex line segment 2A. This optical strength should, together with the optical strength of front vertex line segment 4A, give the desired optical strength of the lens segment corresponding to line segments 2A, 4A. This latter desired optical strength can be derived from the progression curve in FIG. 1, wherein the optical strength associated with front line segment 4A, as well as the other front line segments, is fixed.

Parameters A2 and C2 are found such that rear vertex line 2A has the desired optical strength and such that a desired imaging quality is achieved. For example, a size of a region of least confusion can be calculated using ray tracing techniques. When applying these techniques, a model of an eye can be used that describes the optical properties of the eye of the intended user. The retina of this model could for example be moved between the sagittal focal plane and the meridional focal plane of the segment lens corresponding to rear vertex line segment 2A to find the region of least confusion. The size of this region should be minimized while at the same time the desired optical strength should be achieved. During this optimization it may be useful to use bounds for moving the retina, i.e. to move within a given range back and forth towards the lens segment, and to use a desired optical strength range, for example +/− 5% of the desired optical strength as dictated by the progression curve. Typically, A2 and C2 are determined such that an at least local minimum if found for the size of the region of least confusion while the optical strength is within the above-mentioned desired optical strength range. Furthermore, as a starting condition, A2 may be set equal to A1. It should be noted that the optical strength may be predominantly determined by C2. Nevertheless, when changing A1, its affect on the optical strength must be accounted for by also varying C2.

For the next rear vertex line segment 2B, parameter A2 can be taken equal to the optimized value of A2 for rear vertex line segment 2A.

By repeating the procedure above, rear vertex line 2 can be specified completely. In some cases, it may be advantageous to deviate slightly from the progression curve according to the progression curve and to perform one or more re-iteration steps.

As shown in FIG. 3, constructed rear vertex line 2 comprises multiple segments that are now characterized by known Cartesian ovals. This means that these line segments are shaped as small sections of these ovals. Furthermore, rear vertex line 2 extends between start point S1 and an end point S3, whereas front vertex line 4 extends between start point S2 and an end point S4.

As a next step, both rear vertex line 2 and front vertex line 4 are rotated about axis of rotation R1, preferably by 360 degrees, for forming a main rear surface and a main front surface, respectively. This is illustrated in FIG. 3 using lines 2' and 4', respectively, where it is noted that FIG. 3 is a cross sectional view.

Main front surface is a spherical surface whereas main rear surface is not. Moreover, start points S1 and S2 represent umbilical points as the respective main surfaces are locally spherical at these points.

Next, a cut-out region 5 is defined on this surface. Cut-region 5 defines the lens to be manufactured. More in particular, the cut-out regions of the main front surface and the main rear surface are used for controlling the machines that manufacture the eyeglass lens such that the rear surface of that lens corresponds to the cut-out region of the main rear surface and that the front surface of that lens corresponds to the cut-out region of the main front surface.

In some cases, a large thickness variation may occur in the lens. To solve this issue, the main front surface may be rotated about a third axis of rotation R2 such that the thickness variation is reduced. This latter rotation is a well known procedure to adapt the lens thickness. Additionally or alternatively, the separation between the main rear surface and the main front surface can be changed.

Figure 4:
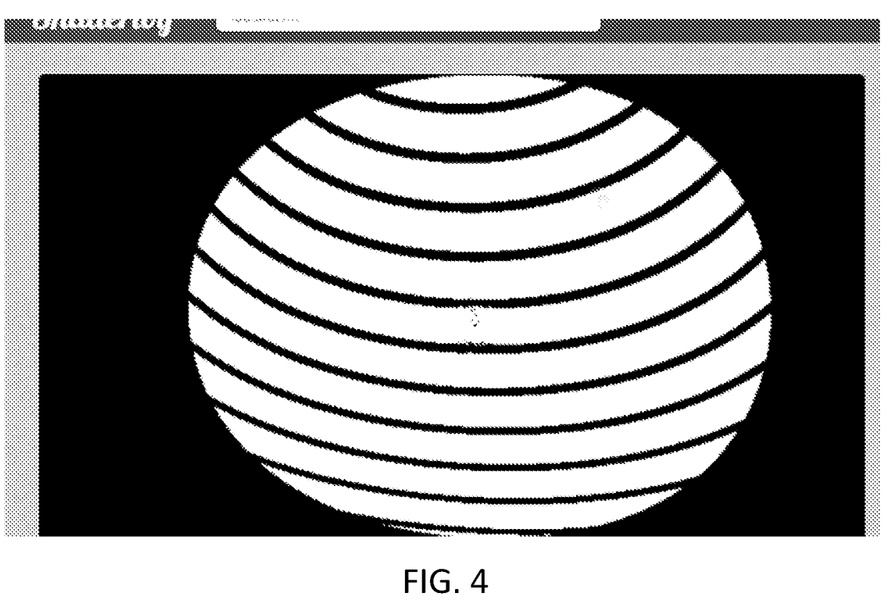
FIG. 4 shows the optical power profile of a rotationally symmetric varifocal eyeglass in accordance with the invention.

FIG. 4 shows the optical power profile of a rotationally symmetric varifocal eyeglass. The addition (optical power difference from top to bottom) for this lens is 2.5 D. The rotation axis of the rear surface is located at the common center of the radial arcs above the lens.

Figure 5:
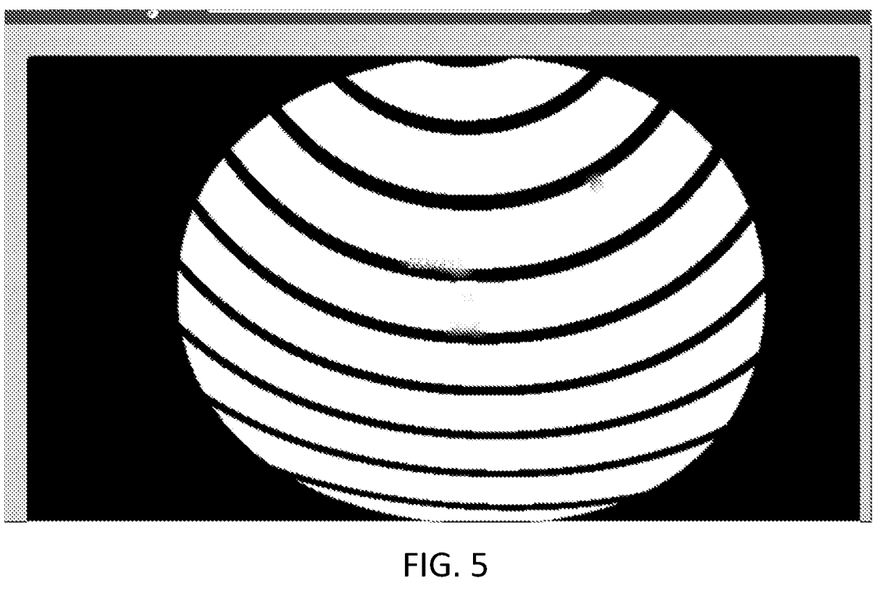
FIG. 5 shows the astigmatism profile of the eyeglass of FIG. 4.

FIG. 5 shows the astigmatism profile of the rotationally symmetric varifocal eyeglass of FIG. 4. The rotation axis of the rear surface is located at the common center of the radial arcs above the lens. The astigmatism increases from 0 D at the top to about 1.0 D at the bottom.

Figure 6:
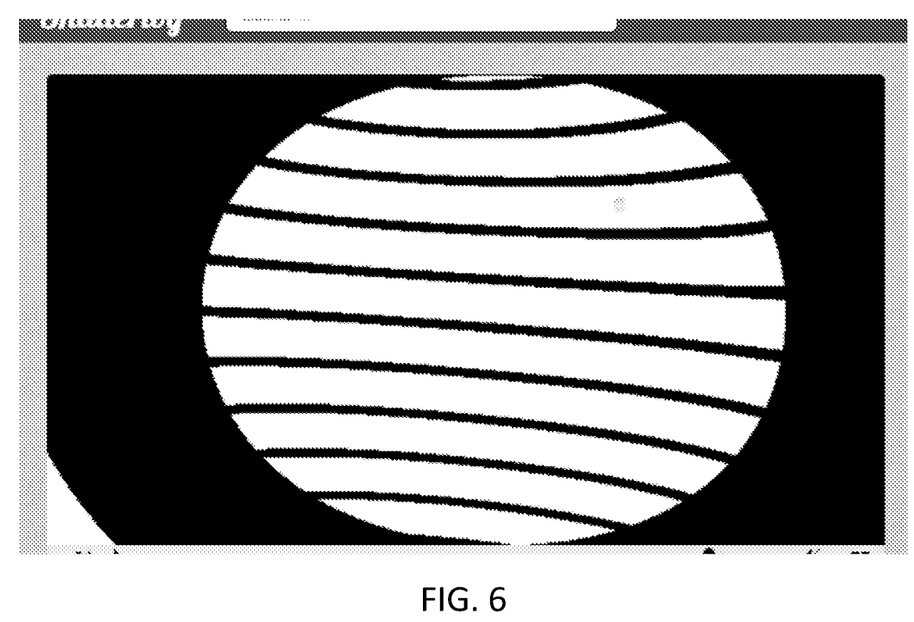
FIG. 6 shows the optical power profile of the varifocal eyeglass of FIG. 4 when torically deformed.

FIG. 6 shows the optical power profile of the varifocal eyeglass of FIG. 4 when torically deformed. It clearly shows that by using differential toric deformation, the power contour lines can be made to approximate horizontal lines, meaning that the perceived optical power remains more constant from left to right at the same viewing height or viewing angle respectively. Differential torical deformation means that the torical deformation increases or decreases from the top of an initially rotationally symmetric varifocal lens to the bottom of said lens. The addition (optical power difference from top to bottom) for this lens is 2.5 D.

Figure 7:
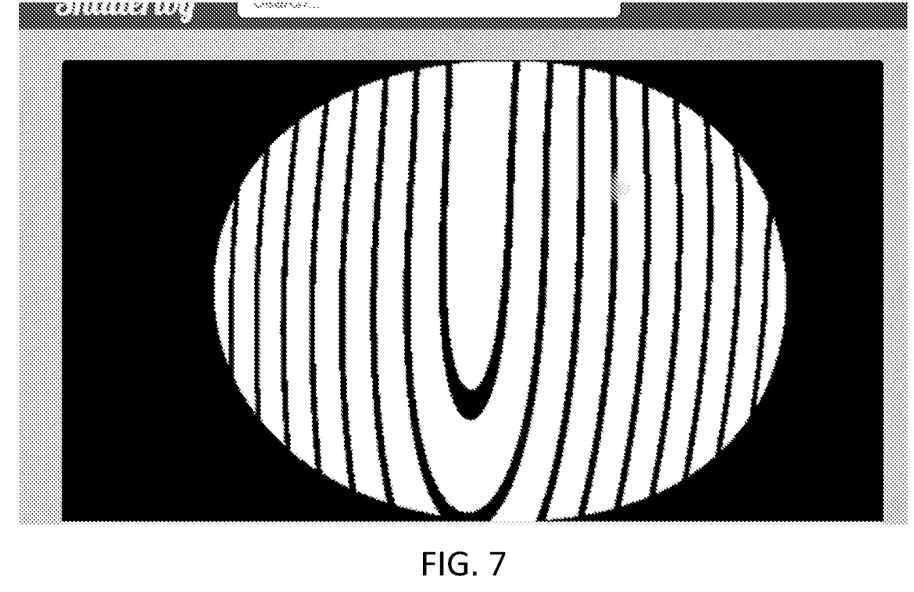
FIG. 7 shows the astigmatism profile corresponding to the torically deformed varifocal eyeglass of which the optical power profile was shown in FIG. 6.

FIG. 7 shows the astigmatism profile corresponding to the torically deformed varifocal eyeglass of which the optical power profile was shown in FIG. 6. The astigmatism increases from 0 D at the top to about 0.2 D at the bottom along the central vertex line. From the center to either the left or the right side of the glass the astigmatism increases by about 0.5 D. It clearly shows that by using differential toric deformation, the increase of astigmatism to the left and right can be made both smaller and more evenly distributed than in a rotationally varifocal glass according to the present invention. This means that the so called corridor of varifocal eyeglasses according to the present invention can be made both wider and of a more homogeneous width from the top to the bottom of the lens.

For the examples shown in FIGS. 4-6, a simple elliptical eyeglass form was used with 20 mm vertical half axis and 25 mm horizontal half axis. Since a commercial base semi-finished spherical blank was used in this case, a full front surface was already defined, which formally can be obtained by rotating a constant-curvature profile around a rotation axis that is essentially positioned in the center of the intended final eyeglass lens.

Using a commercial CNC freeform lens cutting machine, the exact form of the rear surface was machined into the rear surface of the semi-finished blank. As a final step, the resulting lens was given a contour to fit the eyeglass frame chosen, in this case of elliptical form. This procedure, like the polishing of the rear surface and applying anti-reflection and anti-scratch coating, is standard in the optical industry.

In the above, the present invention has been described using detailed embodiments thereof. It should be noted that various modifications can be made without departing from the scope of the invention which is defined by the appended claims and their equivalents.

The invention claimed is:

1. A method for manufacturing a progressive addition eyeglass lens, comprising:
   providing a predefined progression curve describing a desired optical power of the lens as a function of a viewing angle at which a user looks through the lens, wherein the lens comprises a rear surface intended to face an eye of the user and a front surface opposite to the rear surface;

constructing front and rear vertex lines for the lens corresponding to the front and rear surfaces of the lens, respectively, by translating the progression curve into corresponding longitudinal curvatures for the front and back lens surface, wherein the vertex lines extend from a start point corresponding to a distance viewing area of the lens to an end point corresponding to a reading area of the lens;

rotating the constructed rear vertex line around a first axis of rotation to construct a main rear surface;

rotating the constructed front vertex line around a second axis of rotation to construct a main front surface, wherein the first and second axis of rotation are parallel to a line of sight, said line of sight corresponding to a line extending from an intended position of a user's eye relative to the eyeglass lens to a distant point when said user's eye is looking straight ahead;

defining a cut-out region in the main rear surface and the main front surface thereby defining a lens to be manufactured; and manufacturing a lens in correspondence with the defined lens to be manufactured;

wherein subjecting the defined lens to be manufactured to a differential torical deformation, and in that said manufacturing a lens in correspondence with the defined lens to be manufactured comprises manufacturing the lens to have a shape that corresponds to the deformed lens to be manufactured, wherein by using the differential torical deformation, optical power contour lines of the progressive addition eyeglass lens can be made to approximate horizontal lines, wherein subjecting the defined lens to be manufactured to a differential torical deformation causes the torical deformation to increase or decrease from a top of an initially rotationally symmetric progressive addition eyeglass lens to a bottom of said lens.

2. The method according to claim 1, wherein the first axis of rotation is displaced relative to said line of sight and/or wherein the second axis of rotation coincides with said line of sight.

3. The method according to claim 1, wherein the differential torical deformation is configured to allow a perceived optical strength of the manufactured progressive addition eyeglass lens to remain more constant from left to right at a same viewing height or viewing angle.

4. The method according to claim 1, wherein said translating the progression curve into corresponding longitudinal curvatures for the front and back lens surface comprises constructing a rear vertex line corresponding to the rear surface of the lens using a plurality of segments, each line segment corresponding to a Cartesian oval of which the focal points and/or focal lengths are determined, by means of optimization, in dependence of the desired optical strength for that line segment and a desired imaging quality.

5. The method according to claim 4, wherein said constructing a rear vertex line comprises:

calculating, by means of optimization, for each line segment, an inner focal point and/or inner focal length corresponding to a side of the rear surface facing away from the eye of the user, and an outer focal point and/or outer focal length corresponding to a side of the rear surface facing the eye of the user in dependence of the desired optical strength for that line segment and a desired imaging quality.

6. The method according to claim 5, wherein said calculating comprises:

finding, for each line segment, by means of optimization, the inner focal point and/or inner focal length and the outer focal point and/or outer focal length such that for these focal points and/or focal lengths the optical strength of that line segment is within a predefined range of the desired optical strength for that line segment and such that a size of a region of least confusion has an at least local minimum.

7. The method according to claim 6, wherein the size of the region of least confusion for a Cartesian oval that is currently tried for a given line segment is determined in between a sagittal focal plane and a meridional focal plane of a segment lens corresponding to said line segment, wherein the vertex line at least locally extends in said meridional focal plane, and wherein a shape of the segment lens is determined by rotating said Cartesian oval around the first axis of rotation.

8. The method according to claim 5, wherein, for finding the inner focal point and/or inner focal length of a next line segment, the value of the inner focal point and/or inner focal length of a current segment is taken.

9. The method according to claim 5, wherein the rear vertex line is constructed such that the start point of the rear vertex line and a corresponding start point of the front vertex line correspond to umbilical points of the main rear surface and main front surface, respectively, wherein the first axis of rotation passes through the start points of the rear and front vertex lines.

10. The method according to claim 5, wherein the steps of constructing a rear vertex line and rotating the constructed rear vertex line are performed using a processor.

11. The method according to claim 5, wherein the main front surface is predefined.

12. The method according to claim 11, wherein the focal points and/or focal lengths of the respective Cartesian oval for each line segment are determined by the optical strength of a corresponding line segment of the main front surface and said desired imaging quality, wherein the desired optical strength for each line segment of the rear vertex line is calculated, using the progression curve, in dependence of a desired optical strength of the lens corresponding to that line segment.

13. The method according to claim 1, wherein the predefined progression curve is smooth and at least two times differentiable.

14. The method according to claim 13, wherein the predefined progression curve has a sigmoid shape.

15. The method according to claim 1, further comprising performing a relative rotation of the main front surface relative to the main rear surface relative to a third axis of rotation prior to defining the cut-out region to be used for manufacturing the lens, to allow an upper and lower portion of the lens to have comparable thickness.

16. The method according to claim 15, wherein the third axis of rotation extends in a direction perpendicular to the first axis of rotation and the rear vertex line.

17. A progressive addition eyeglass lens having a rear surface intended to face the eye of a user and a front surface opposite to the rear surface;

wherein the lens is manufactured in correspondence with a lens to be manufactured, said lens to be manufactured having been defined by defining a cut-out region in the main rear surface and the main front surface, wherein the main rear and front surface comprise a surface of revolution created by rotating a rear and front vertex line around a first and second axis of rotation, respectively, wherein the first and second axis of rotation are parallel to a line of sight, said line of sight corresponding to a line extending from an intended position of a user's eye relative to the eyeglass lens to a distant point when said user's eye is looking straight ahead, said rear and front vertex line corresponding to a translation of a progression curve into corresponding longitudinal curvatures for the rear and front lens surface;

wherein the lens to be manufactured has been subjected to a differential torical deformation such that optical power contour lines of the progressive addition eyeglass lens approximate horizontal lines, wherein as a result of subjecting the defined lens to be manufactured to a differential torical deformation, the torical deformation increases or decreases from a top of an initially rotationally symmetric progressive addition eyeglass lens to a bottom of said lens.

18. The progressive addition eyeglass lens according to claim 17, wherein the first axis of rotation is displaced relative to said line of sight and/or wherein the second axis of rotation coincides with said line of sight.

19. The progressive addition eyeglass lens according to claim 17, wherein the differential torical deformation is configured to allow a perceived optical strength of the manufactured progressive addition eyeglass lens to remain more constant from left to right at a same viewing height or viewing angle.

20. The progressive addition eyeglass lens according to claim 17, wherein said rear vertex line comprises a smooth connection of line segments, each line segment corresponding to a Cartesian oval of which the focal points and/or focal lengths have been determined, by means of optimization, in dependence of a desired optical strength for that line segment and a desired imaging quality, said desired optical strength depending on the predefined progression curve that describes a desired optical strength of the lens as a function of a viewing angle at which a user looks through the lens.

* * * * *